(12) United States Patent
Oppenheim et al.

(10) Patent No.: US 8,741,225 B2
(45) Date of Patent: Jun. 3, 2014

(54) CARBON CAPTURE COOLING SYSTEM AND METHOD

(75) Inventors: Judith Pauline Oppenheim, Friendswood, TX (US); Anindra Mazumdar, Katy, TX (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 12/566,613

(22) Filed: Sep. 24, 2009

(65) Prior Publication Data

US 2011/0067302 A1 Mar. 24, 2011

(51) Int. Cl.
| | | |
|---|---|---|
| B01D 53/14 | (2006.01) | |
| B01D 53/62 | (2006.01) | |
| C10J 3/72 | (2006.01) | |

(52) U.S. Cl.
USPC ............ 422/187; 422/611; 422/622; 422/649

(58) Field of Classification Search
USPC ......... 422/168, 187, 608, 609, 610, 611, 618, 422/622, 626, 649; 96/242; 48/128; 423/220, 226; 95/228, 229, 236; 62/86
See application file for complete search history.

(56) References Cited

U.S. PATENT DOCUMENTS

| | | | | |
|---|---|---|---|---|
| 2,514,921 A | | 11/1950 | Yendall | |
| 3,349,571 A | * | 10/1967 | Nebgen | ............................ 62/619 |
| 3,417,572 A | * | 12/1968 | Pryor | ............................ 62/634 |
| 3,614,872 A | * | 10/1971 | Tassoney et al. | .............. 62/54.2 |
| 3,801,708 A | * | 4/1974 | Smith et al. | ................... 423/650 |
| 3,824,766 A | * | 7/1974 | Valentine et al. | ............... 95/236 |
| 5,220,782 A | * | 6/1993 | Brown et al. | .................... 95/229 |
| 6,301,927 B1 | * | 10/2001 | Reddy | .............................. 62/619 |
| 7,803,329 B2 | * | 9/2010 | Pedersen et al. | .............. 422/626 |
| 2006/0260189 A1 | * | 11/2006 | Reddy et al. | .................... 48/128 |
| 2010/0111784 A1 | * | 5/2010 | Mak et al. | ...................... 422/190 |

FOREIGN PATENT DOCUMENTS

| | | |
|---|---|---|
| CN | 1045156 | 9/1990 |
| CN | 1105103 | 7/1995 |
| EP | 0 203 651 A2 | 12/1986 |
| EP | 0 792 837 A1 | 11/1996 |
| GB | 692804 A | 6/1953 |
| WO | 2009015430 A1 | 2/2009 |

OTHER PUBLICATIONS

PL Search Report issued in connection with corresponding PL Patent Application No. P-392506 filed on Sep. 24, 2010.
Werke 'Walter Ulbricht'; Manner of Removing Carbondioxide From Converted Gases; Patent Office of Republic of Poland Patent Description; C10K 1/08; Mar. 30, 1969.
Chinese Office Action for Chinese Patent Application No. 201010298552.7; dated Jan. 23, 2014.

* cited by examiner

*Primary Examiner* — Jill Warden
*Assistant Examiner* — Joye L Woodard
(74) *Attorney, Agent, or Firm* — Fletcher Yoder P.C.

(57) ABSTRACT

A system and method is provided for capturing a carbonous gas and using the captured carbonous gas for cooling purposes. For example, a system may include a carbon capture system configured to collect a carbonous gas from a syngas, and a cooling system having a gas expander and a coolant circuit that receive the carbonous gas. The gas expander is configured to expand the carbonous gas to reduce a temperature of the carbonous gas to produce a reduced temperature carbonous gas, and the coolant circuit is configured to utilize the reduced temperature carbonous gas to cool at least one solvent of at least one gas purifier.

23 Claims, 5 Drawing Sheets

CARBON CAPTURE COOLING SYSTEM AND METHOD

BACKGROUND OF THE INVENTION

The subject matter disclosed herein relates to carbon capture systems. Integrated gasification combined cycle (IGCC) power plants are capable of generating energy from various carbonaceous feedstock, such as coal or natural gas, relatively cleanly and efficiently. IGCC technology may convert the carbonaceous feedstock into a gas mixture of carbon monoxide (CO) and hydrogen ($H_2$), i.e., syngas, by reaction with oxygen and steam in a gasifier. These gases may be cleaned, processed, and utilized as fuel in the IGCC power plant. For example, the syngas may be fed into a combustor of a gas turbine of the IGCC power plant and ignited to power the gas turbine for use in the generation of electricity. Such IGCC plants typically require refrigeration systems for use in the process of forming syngas. Unfortunately, current refrigeration systems are environmentally and monetarily costly.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a carbon capture system configured to collect a carbonous gas from a syngas. The system also includes a cooling system comprising the carbonous gas in a coolant circuit.

In a second embodiment, a system includes a gas purifier configured to remove carbon dioxide (CO2) from a gas, a carbon capture system configured to receive the CO2 from the gas purifier, and a CO2 expander configured to expand at least a portion of the CO2 to provide cooling of at least one component.

In a third embodiment, a system includes an acid gas removal (AGR) system comprising a solvent configured to process gas from a gasifier, wherein the AGR system is configured to remove sulfur and carbon dioxide (CO2), and a CO2 expander configured to expand at least a portion of the CO2 to provide cooling of the solvent.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
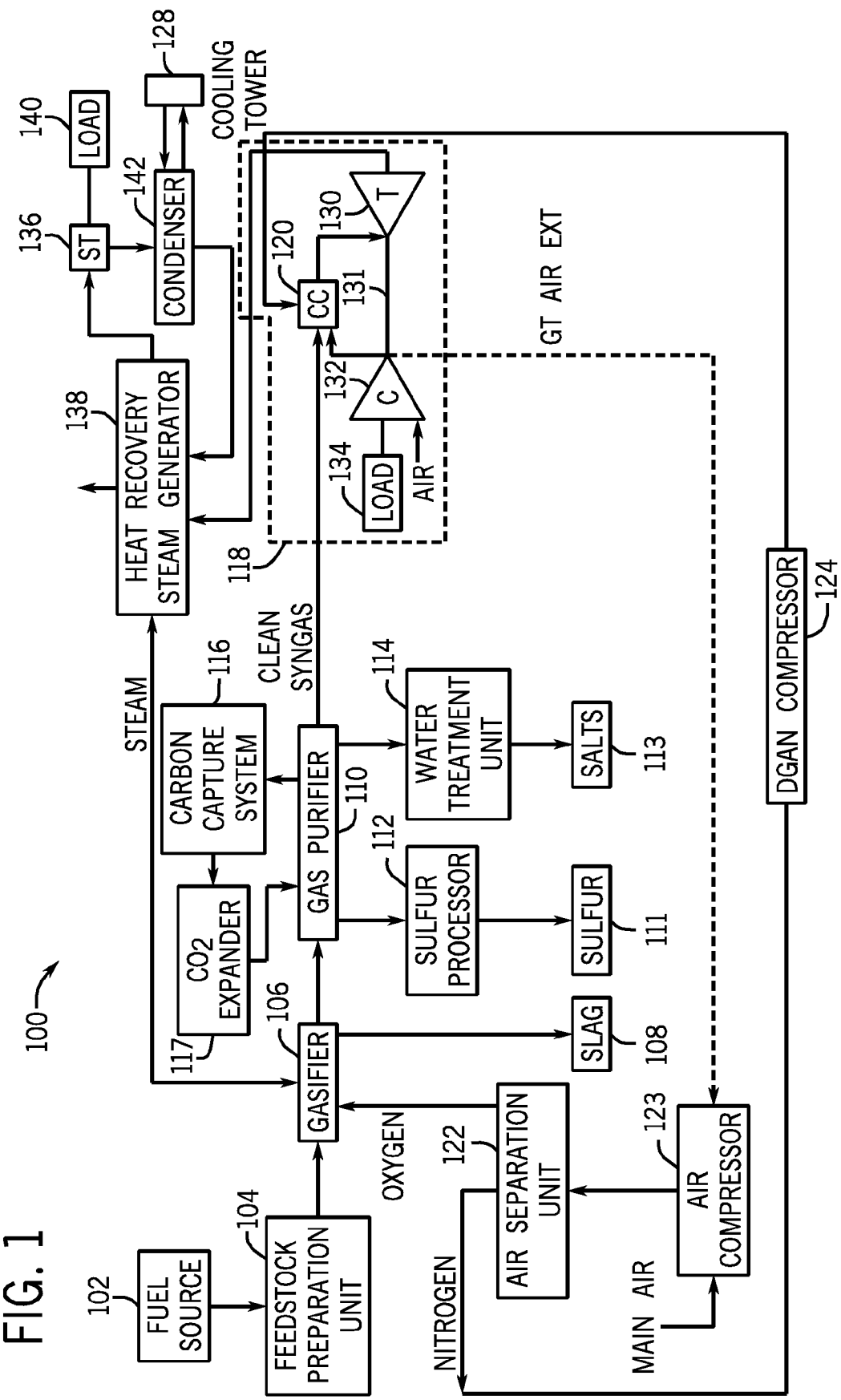
FIG. 1 is a block diagram of an embodiment of an integrated gasification combined cycle (IGCC) power plant incorporating a unique cooling system based on expansion of a captured carbonous gas (e.g., carbon dioxide)

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed below, the disclosed embodiments include a unique cooling system based on expansion of a captured carbonous gas, such as carbon dioxide (CO2) that is approximately 80-100 percent pure by volume. In certain embodiments, the CO2 may be at least approximately 80, 85, 90, 95, or 100 percent pure by volume. In the following discussion, any reference to CO2 should be understood to be any purity as noted above, but not limited to 100 percent purity. The disclosed embodiments may include a carbon capture system configured to separate a carbonous gas (e.g., CO2) from a solid, liquid, or gaseous substance containing carbon. For example, the carbon capture system may receive the substance from a variety of applications, such as a gasification system, a combustion based system (e.g., boiler), or generally from a component of an integrated gasification combined cycle (IGCC) power plant. Upon capturing the carbonous gas, the disclosed embodiments expand the captured carbonous gas to provide cooling for one or more components, thereby increasing efficiencies, e.g., in the IGCC power plant.

The unique cooling system may include an expander (e.g., an adiabatic gas expander) configured to provide expansion (e.g., adiabatic expansion) of captured carbonous gas (e.g., CO2) to decrease the temperature of the captured carbonous gas, which then circulates through one or more cooling circuits (e.g., lines) in components needing cooling. As appreciated, an adiabatic expansion is an increase in volume without heat flow to or from the environment. Thus, an adiabatic expander includes an adiabatic boundary, which is generally impermeable to heat transfer, or an insulated wall that substantially blocks heat transfer to approximate an adiabatic boundary. Inside the insulated wall, the adiabatic expander provides an increase in volume in a flow direction of the captured carbonous gas, thereby dropping the pressure and temperature of the captured carbonous gas. Although an adiabatic expander ideally does not transfer any heat to the surroundings, it should be appreciated that the adiabatic expander may transfer some amount of heat to the surroundings, as insulators do not provide perfect thermal insulation. In other words, the expander may not be perfectly adiabatic. In the following discussion, any reference to an expander should be understood to include either a non-thermally insulated expander or a thermally insulated expander, which may include an adiabatic expander or a near adiabatic expander. A near adiabatic expander may be at least 90-100 percent thermally insulated from the environment. Thus, as appreciated, the expander may include a variety of implementations configured to reduce the temperature of the captured carbonous gas (e.g., CO2) via a volume increase (and thus pressure decrease) of the gas.

In certain embodiments discussed below, expanded carbon dioxide may be used to cool a variety of IGCC components, such as a solvent used in an acid gas removal (AGR) system, a solvent used in a sulfur removal system, a solvent used in a nitrogen removal system, a solvent used in a water gas shift reactor, a distillation column overhead stream, a gas purifier, a compressor, a turbine engine, or any combination thereof. In certain embodiments, the expanded carbon dioxide may be the primary refrigerant responsible for cooling components of the IGCC system. In other embodiments, the carbon dioxide may be employed as a supplement or back-up coolant capable of providing cooling in the event of failure of the main refrigerant system. In solvent based systems, the use of the expanded carbon dioxide byproduct for cooling purposes may reduce the size of system components, because the low temperature of the cooled carbon dioxide reduces the solvent circulation rate necessary to achieve desired residence times. Furthermore, the use of captured carbon dioxide for cooling may eliminate the need for typical cooling components, such as condensers and evaporators used in refrigeration cycles. Thus, in comparison to typical refrigeration cycles, the unique cooling system is relatively simple, consumes less space, and increases the overall efficiency of the IGCC by utilizing an existing source of carbonous gas.

Turning now to the drawings, FIG. 1 is a diagram of an embodiment of an integrated gasification combined cycle (IGCC) system 100 that may produce and burn a synthetic gas, i.e., syngas. As discussed in detail below, one or more IGCC components may be cooled by a unique cooling system based on expansion of a captured carbonous gas. Elements of the IGCC system 100 may include a fuel source 102, such as a solid feed, that may be utilized as a source of energy for the IGCC. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock.

The feedstock may be passed to a gasifier 106 from the feedstock preparation unit 104. The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius to 1600 degrees Celsius, depending on the type of gasifier 106 utilized. The gasification process may include the feedstock undergoing a pyrolysis process, whereby the feedstock is heated. Temperatures inside the gasifier 106 may range from approximately 150 degrees Celsius to 700 degrees Celsius during the pyrolysis process, depending on the fuel source 102 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees Celsius to 1600 degrees Celsius. Next, steam may be introduced into the gasifier 106 during a gasification step. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon monoxide and release energy, which drives a second reaction that converts further feedstock to hydrogen and additional carbon dioxide.

In this way, a resultant gas is manufactured by the gasifier 106. This resultant gas may include approximately 85% of carbon monoxide and hydrogen in equal proportions, as well as CH4, HC1, HF, COS, NH3, HCN, and H2S (based on the sulfur content of the feedstock). This resultant gas may be termed dirty syngas, since it contains, for example, H2S. The gasifier 106 may also generate waste, such as slag 108, which may be a wet ash material. This slag 108 may be removed from the gasifier 106 and disposed of, for example, as road base or as another building material. To clean the dirty syngas, a gas purifier 110 may be utilized. In one embodiment, the gas purifier 110 may be a water gas shift reactor. The gas purifier 110 may scrub the dirty syngas to remove the HC1, HF, COS, HCN, and H2S from the dirty syngas, which may include separation of sulfur 111 in a sulfur processor 112 by, for example, an acid gas removal process in the sulfur processor 112. Furthermore, the gas purifier 110 may separate salts 113 from the dirty syngas via a water treatment unit 114 that may utilize water purification techniques to generate usable salts 113 from the dirty syngas. Subsequently, the gas from the gas purifier 110 may include clean syngas, (e.g., the sulfur 111 has been removed from the syngas), with trace amounts of other chemicals, e.g., NH3 (ammonia) and CH4 (methane).

In some embodiments, a gas processor may be utilized to remove additional residual gas components, such as ammonia and methane, as well as methanol or any residual chemicals from the clean syngas. However, removal of residual gas components from the clean syngas is optional, since the clean syngas may be utilized as a fuel even when containing the residual gas components, e.g., tail gas. At this point, the clean syngas may include approximately 3% CO, approximately 55% H2, and approximately 40% CO2 and is substantially stripped of H2S.

In some embodiments, a carbon capture system 116 may remove and process the carbonous gas (e.g., carbon dioxide that is approximately 80-100 percent pure by volume) contained in the syngas. The carbon capture system 116 also may include a compressor, a purifier, a pipeline that supplies CO2 for sequestration or enhanced oil recovery, a CO2 storage tank, or any combination thereof. The captured carbon dioxide is then transferred to a carbon dioxide expander 117, which expands the volume of the carbon dioxide to reduce the pressure by a suitable factor. For example, the carbon dioxide expander 117 may increase the volume and reduce the pressure by a factor of approximately 2-4, e.g., a factor of approximately 2. The carbon dioxide expander 117 may be any suitable expansion mechanism configured to increase volume, reduce pressure, and reduce temperature of the captured carbonous gas (e.g., CO2 of at least 80 percent purity by volume). In some embodiments, the carbon dioxide expander 117 may be a thermally insulated expander (e.g., an adiabatic expander or a near adiabatic expander), a non-insulated expander, a throttle valve, and so forth. For example, the carbon dioxide expander 117 could be any device that expands the volume of the carbonous gas in a thermally insulated enclosure, thereby lowering the temperature of the carbonous gas. Since the carbon dioxide is at a high pressure (e.g., approximately 2000-3000 psi, or about 2500 psi) when it enters the carbon dioxide expander 117, volumetric expansion leads to a decrease in the temperature of the carbon dioxide (e.g., approximately 5-100 degrees C., or about 20-30 degrees C.), thus enabling the carbon dioxide to be used as a suitable cooling agent for the system. Accordingly, the cooled carbon dioxide (e.g., approximately 20-40 degrees C., or about 30 degrees C.) may be circulated through the system to meet its refrigeration needs or expanded through subsequent stages for even lower temperatures. The clean syngas, which has undergone the removal of its sulfur containing components and a large fraction of its carbon dioxide, may be then transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
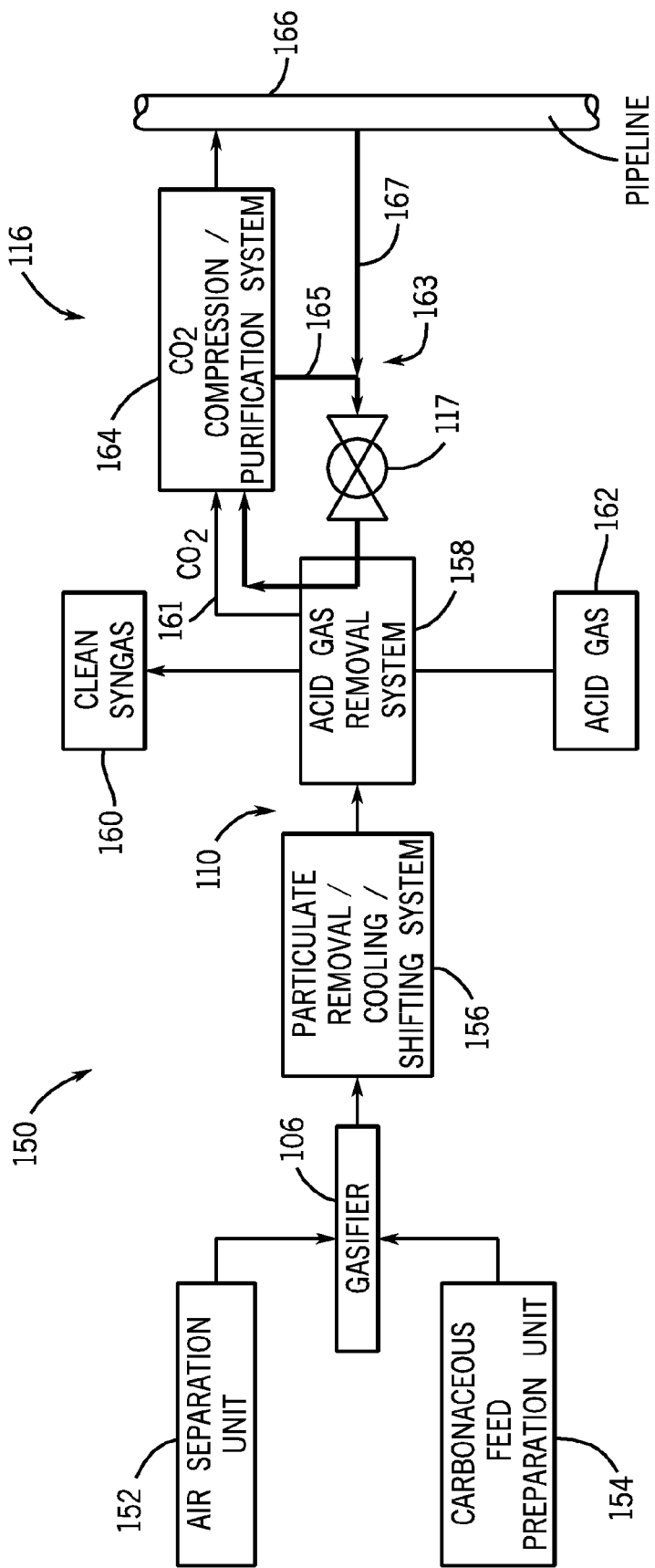
FIG. 2 is a block diagram of an embodiment of a gasification system as illustrated in FIG. 1, including a unique cooling system based on expansion of a captured carbonous gas.

FIG. 2 is a block diagram of an embodiment of a gasification system or process 150 as illustrated in FIG. 1, including a unique cooling system based on expansion of a captured carbonous gas. The gasification process 150 includes an air separation unit 152, a carbonaceous feed preparation unit 154, the gasifier 106, a particulate removal, cooling, and shifting system 156, an acid gas removal (AGR) system 158, a carbon dioxide compression and purification system 164, and a unique cooling system or circuit 163. As discussed in further detail below, the cooling system or circuit 163 includes the carbon dioxide expander 117, and may also include the compression/purification system 164 (e.g., a compressor) and/or a pipeline 166 as a source of compressed carbonous gas (e.g., CO2). During operation, the expander 117 causes a volumetric expansion and pressure drop of the carbonous gas, which in turn causes substantial cooling of the carbonous gas for subsequent use as a coolant in the AGR system 158. Thus, the cooling system 163 circulates the carbonous gas through one or more lines, loops, and/or heat exchangers as a coolant, thereby providing cooling to equipment in the system 150.

As illustrated, the gasifier 106 receives supplies of air and carbonaceous feed from the units 152 and 154. For example, the carbonaceous feed preparation unit 154 may grind and mix a carbonaceous feed (e.g., coal, petroleum, biomass, biofuel) with a liquid (e.g., water) or gas, and transfer the prepared feed to the gasifier 106. In some embodiments, the unit 154 may include a posimetric pump to meter and pressurize the prepared feed to the gasifier 106. The ASU 152 of the gasification process 150 may operate by separating air into component gases. For example, distillation techniques that may be cryogenic or may utilize pressure swing adsorption (PSA) may be employed by the ASU 152. The ASU 152 may separate oxygen from the air supplied to it and may transfer the separated oxygen to the gasifier 106, as described above. Additionally the ASU 152 may separate gases, such as nitrogen, for collection or for downstream use in power generation. In turn, the gasifier 106 converts the carbonaceous feed into dirty syngas (e.g., syngas containing sulfur).

The gasifier 106 utilizes the oxygen and feed from the units 152 and 154 to generate syngas via a combustion process. For example, the gasifier 106 may be configured to react char and residue gases with the oxygen to form carbon dioxide and carbon monoxide. The temperatures during the combustion process may range from approximately 700 degrees Celsius to approximately 1600 degrees Celsius. In some embodiments, the gasifier 106 may introduce steam, thereby causing reaction between the char, carbon dioxide, and steam to produce carbon monoxide and hydrogen at temperatures ranging from approximately 800 degrees Celsius to 1100 degrees Celsius. In essence, the gasifier 106 utilizes steam and oxygen to allow some of the carbonaceous feed from the carbonaceous feed preparation unit 154 to combust to produce carbon dioxide and energy, thus driving a main reaction that converts further carbonaceous feed to hydrogen and additional carbon monoxide. In this way, the resultant dirty syngas is manufactured by the gasifier 106. It should be noted that the raw syngas may include approximately 85% of carbon monoxide and hydrogen, as well as CH4, HC1, HF, NH3, HCN, COS and H2S (based on the sulfur content of the carbonaceous feed).

The gasification process 150 then transfers the dirty syngas to the particulate removal, cooling, and shifting system 156. As appreciated, the gasifier 106 may generate unwanted waste, such as slag and wet ash. Thus, the system 156 may filter and discard the undesirable byproducts of the gasification. In certain embodiments, these byproducts may be disposed of as road base or another building material. In addition, the system 156 may include a water gas shift (WGS) reactor configured to perform a WGS reaction, wherein carbon monoxide reacts with water, (e.g. steam), to form carbon dioxide and hydrogen. The WGS reaction may be performed to adjust the ratio of hydrogen to carbon monoxide in the raw syngas from approximately 1 to 1 to approximately 3 to 1, for proper methanation. Subsequently, a methanation reactor may perform a methanation process to convert the CO and the H2 in the syngas into CH4 and H2O, that is, into methane, (e.g., SNG), and water.

The system 156 routes the dirty syngas to the AGR system 158 to produce clean syngas 160 by removing carbon dioxide 161 and acid gas 162. For example, the AGR system 158 may utilize reactions to separate the acid gas 162 (e.g., hydrogen sulfide [$H_2S$]) and carbon dioxide 161 (CO2) from the dirty syngas, thereby yielding the clean syngas 160 (e.g., syngas without sulfur and carbon dioxide). In certain embodiments, the AGR system 158 may utilize a thermal swing process to separate the acid gas 162 from the desirable syngas. For example, the thermal swing process may include an adsorption step whereby the adsorption of H2S is carried out and then a thermal regeneration step using air or oxygen enriched air. This thermal swing process (i.e., warm gas cleanup) may include mixing the syngas with fluidized media, such as zinc oxide (ZnO) to generate zinc sulfide (ZnS) in the adsorption step. In the regeneration step, that zinc sulfide may be mixed under heat with oxygen (O2) to generate sulfur dioxide (SO2), which may be transmitted to other system components for removal and disposal of the sulfur.

The AGR system 158 then routes the clean syngas 160 to a gas turbine, a boiler, a pipeline, a storage tank, an IGCC component, or another suitable application. The AGR system 158 also routes the acid gas 162 to one or more additional processing systems, such as a sulfur recovery unit. In the illustrated embodiment, the AGR system 158 also routes the carbon dioxide 161 to a suitable carbon capture system 116, which may include the CO2 compression and purification system 164, the pipeline 166, a storage tank, or any other destination that does not waste the carbon. For example, the system 164 may dehydrate and compress the CO2 for storage and subsequent use. In the illustrated embodiment, the system 164 routes the CO2 to the pipeline 166, which transfer the CO2 for carbon sequestration, e.g., enhanced-oil recovery (EOR) or saline aquifers.

In the illustrated embodiment, the process 150 includes a unique cooling system or circuit 163, which includes the carbon dioxide expander 117 and the compression/purification system 164 (e.g., a compressor). For example, the circuit 163 may include a flow of compressed carbon dioxide 165 directly from the compression/purification system 164 and/or a flow of compressed carbon dioxide 167 from the pipeline 166. By further example, the compressed carbon dioxide may be acquired from other sources or processes within the IGCC system 100. Regardless of the source, the carbon dioxide is substantially compressed and able to undergo an expansion in the carbon dioxide expander 117, thereby providing a source of cooling.

The CO2 entering the carbon dioxide expander 117 is taken from a high pressure to a low pressure via expansion. In some embodiments, the expansion may be adiabatic, near adiabatic, or substantially thermally insulated to reduce heat transfer between the CO2 and the environment. The volumetric expansion, which coincides with this pressure drop, results in a decrease in temperature of the CO2. In certain embodiments, the CO2 expander 117 may drop the pressure and/or temperature by at least approximately 30, 40, 50, 60, 70, 80, 90, 100, 200, 300, or 400 percent. For example, the pressure may drop by a factor of approximately 2-4 (e.g., a factor of approximately 2), and the temperature may drop by approximately 5-100 degrees C. (e.g., approximately 20-30 degrees C.). However, any changes in volume, pressure, and temperature are within the scope of the disclosed embodiments, and these examples are not intended to be limiting in any way. The cooled carbon dioxide may then be recirculated through components of the AGR system 158 to provide cooling. For example, the expanded carbon dioxide may be used to lower the temperature of a solvent used in the AGR system 158. In certain embodiments, the expanded carbon dioxide may cool the solvent by a temperature change of approximately 5 to 100 degrees C. (e.g., approximately 20-30 degrees C.). However, as appreciated, the change in temperature may depend on the flow rates and other application specific considerations.

Figure 3:
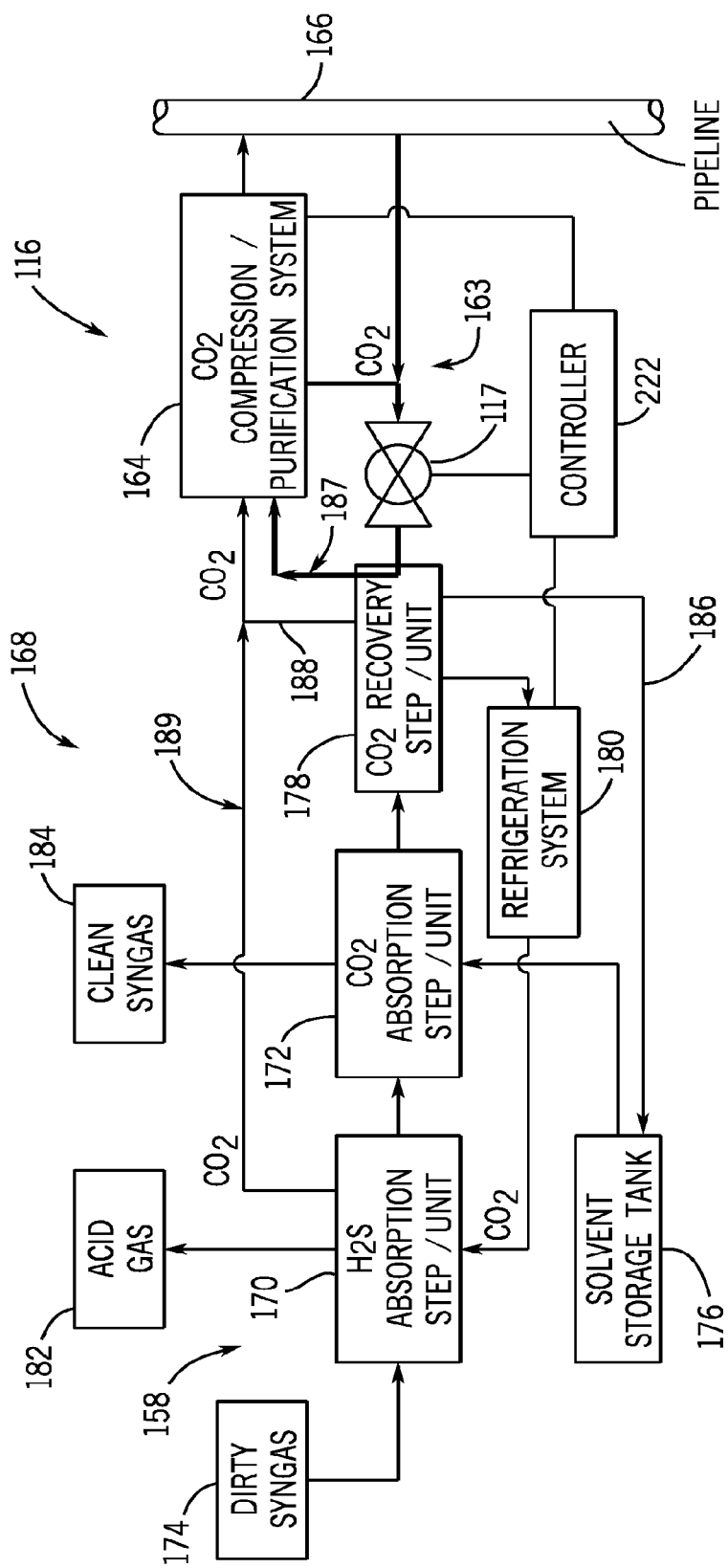
FIG. 3 is a block diagram of an embodiment of a gas purification and carbon capture system as illustrated in FIG. 1, including a unique cooling system based on expansion of a captured carbonous gas.

FIG. 3 is a block diagram of an embodiment of a gas purification and carbon capture system 168 as illustrated in FIG. 1, including a unique cooling system 163 based on expansion of a captured carbonous gas. The illustrated system 168 includes the AGR system 158 and the carbon capture system 116. The AGR system 158 includes a hydrogen sulfide (H2S) absorption step or unit 170 (e.g., acid gas removal unit). The carbon capture system 116 includes a CO2 absorption step or unit 172, a solvent storage tank 176, and a CO2 recovery step or unit 178. The carbon capture system 116 also may include the CO2 compression and purification system 164, the pipeline 166, a CO2 storage tank, or another use of the CO2. As discussed in detail below, the illustrated embodiment includes the cooling system or circuit 163, which expands the compressed CO2 in the expander 117 to cause cooling of the CO2 for use as a coolant. In certain embodiments, the cooled CO2 may be used as a coolant for the H2S absorption unit 170, the CO2 absorption unit 172, the CO2 recovery unit 178, or any combination thereof. The cooled CO2 also may be used for other components in the IGCC system 100.

In the illustrated embodiment, the cooling system 163 uses expanded CO2 to cool both the H2S absorption unit 170 and the CO2 recovery unit 178. For example, the cooling system 163 may route the expanded, and thus cooled CO2, through the CO2 recovery unit 178 followed by the H2S absorption unit 170. In the illustrated embodiment, the refrigeration system 180 may provide additional cooling of the CO2 between the CO2 recovery unit 178 and the H2S absorption unit 170. However, the refrigeration system 180 may be substantially reduced in capacity, or completely removed, in view of the cooling provided by the cooling system 163. As illustrated, the cooling system 163 includes a first CO2 coolant loop 187 and a second CO2 coolant loop 189 for circulation of cooled CO2. The first coolant loop 187 circulates CO2 through the CO2 recovery unit 178 and the expander 117, as well as the CO2 compression and purification system 164 and/or the pipeline 166. The second coolant loop 189 circulates CO2 through the CO2 recovery unit 178, the refrigeration system 180, and the H2S absorption unit 170, and then returns the CO2 to the CO2 compression and purification system 164 and/or the pipeline 166. These loops 187 and 189 may be coupled together, such that the first coolant loop 187 routes a first portion of CO2 to the CO2 compression and purification system 164 and a second portion of CO2 to the second coolant loop 189 after using the CO2 for coolant in the CO2 recovery unit 178.

The H2S absorption unit 170 removes H2S from a dirty syngas 174 via one or more exothermic reactions, thereby providing an acid gas flow stream 182. The refrigeration system 180 and/or the cooling system 163 provide cooling for the unit 170 to reduce the temperature due to the exothermic reaction. As discussed above, the acid gas 182 may be transferred to a sulfur recovery unit for collection of elemental sulfur.

Once the syngas has been stripped of H2S, it enters the CO2 absorption unit 172. In the illustrated embodiment, the CO2 absorption unit 172 uses a solvent to remove the CO2 from the syngas. The unit 172 receives the solvent from the solvent storage tank 176. For example, an aqueous solution containing one or more alkanolamines (e.g., monoethanolamine, diethanolamine, diisopropylamine, etc.) may be removed from the solvent storage tank 176 in an amount suitable for absorption of the CO2 contained in the syngas. Clean syngas 184, which has been stripped of both H2S and CO2, is then used for power generation or other downstream chemical processes.

The unit 172 transfers the amine-based solvent enriched with CO2 into the CO2 recovery unit 178, which isolates the CO2 for use in the carbon capture system 116. For example, the CO2 recovery unit 178 may include a regenerator that strips the solution of CO2. A regenerated stream of cleaned solvent 186 is then recycled to the solvent storage tank 176 for reuse in the CO2 absorption unit 172.

The unit 178 transfers the captured CO2 188 into the carbon capture system 116 for compression, expansion, and subsequent recirculation through the AGR system 158 to meet its cooling needs. For example, the carbon capture system 116 may include the CO2 compression and purification unit 164, the CO2 pipeline 166, a storage tank, the carbon dioxide expander 117, or another suitable use of the CO2. As discussed above, the expander 117 causes a volumetric expansion and pressure drop of the CO2, thereby causing a temperature decrease of the CO2. For example, the expander 117 may cool the carbon dioxide to a temperature of approximately 35 degrees C., which may be used to cool the solvent from the solvent storage tank 176 to a temperature of approximately 45 to 55 degrees C. before it is fed to the CO2 absorption step 172. The foregoing feature may have the effect of increasing the efficiency of the absorption process, since the syngas has higher solubility at lower temperatures. In certain embodiments, the chilled carbon dioxide may be used to cool the syngas between steps in the AGR system 158.

Figure 4:
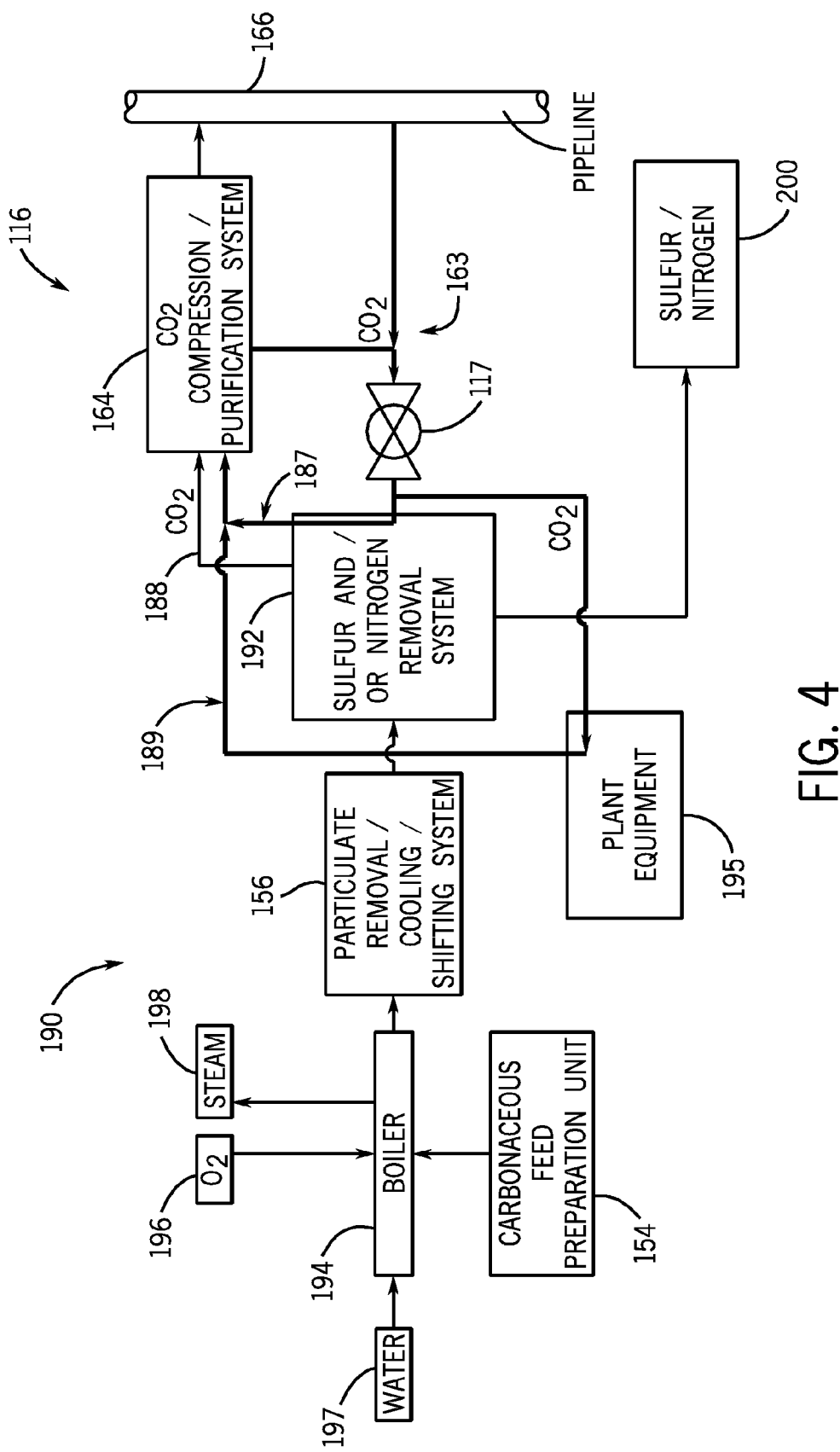
FIG. 4 is a block diagram of an embodiment of a combustion-based system (e.g., boiler) having a gas purification and carbon capture system, including a unique cooling system based on expansion of a captured carbonous gas.

FIG. 4 is a block diagram of an embodiment of a combustion-based system 190 having a gas purification and carbon capture system 191, including a unique cooling system 163 based on expansion of a captured carbonous gas. In the illustrated embodiment, the gas purification and carbon capture system 191 includes the particulate removal, cooling, and shifting system 156, a sulfur and/or nitrogen removal system 192, and the carbon capture system 116. As discussed above, the carbon capture system 116 may include the CO2 compression and purification system 164, the pipeline 166, a CO2 storage tank, and a variety of applications of the CO2. In particular, the carbon capture system 116 provides compressed CO2 to the unique cooling system 163 for expansion of the CO2, thereby cooling the CO2 to act as a coolant for the system 190. The cooled CO2 may be used as a coolant for any component of the system 191, as well as a boiler 194 and other plant equipment 195 in the combustion-based system 190.

The boiler 194 receives a supply of oxygen 196 and a carbonaceous fuel from the carbonaceous feed preparation unit 154 to produce hot gases of combustion. The boiler 194 also receives a supply of water 197, which is heated by the hot gases to produce steam 198. The boiler 194 routes the steam 198 to one or more components, such as a steam turbine for power generation. The boiler 194 also routes the hot gases of combustion to the particulate removal, cooling, and shifting system 156 for purification as discussed above. The system 156 then routes the combustion gases to the sulfur and/or nitrogen removal system 192, which separates a sulfur/nitrogen rich stream 200 from a carbon dioxide containing stream 188.

In the illustrated embodiment, the cooling system 163 provides a cooled CO2 to the sulfur and/or nitrogen removal system 192 and the plant equipment 195. For example, the cooling system 163 includes the first coolant loop 187 and the second coolant loop 189. The first coolant loop 187 circulates CO2 through the sulfur and/or nitrogen removal system 192 and the expander 117, as well as the CO2 compression and purification system 164 and/or the pipeline 166. The second coolant loop 189 circulates CO2 through the plant equipment 195. In the illustrated embodiment, the first coolant loop 187 diverts a portion of the cooled CO2 to the plant equipment 195 before passing through the sulfur and/or nitrogen removal system 192. However, in other embodiments, the cooled CO2 may be used to cool the removal system 192 prior to use for cooling the plant equipment 195, depending on the cooling needs. The plant equipment 195 may include a variety of IGCC components, power generation equipment, engines, chemical processing units, heat exchangers, or the like. For example, the cooling system 163 may use the cooled CO2 for cooling an overhead stream of a distillation column. For instance, the cooled CO2 may be used to lower the temperature of an overhead stream associated with a distillation column that is used to separate the syngas product from the reflux. In additional embodiments, the cooled CO2 may be used as a refrigerant for any overhead stream associated with any continuous distillation process in the IGCC power plant. That is, the cooled CO2 may be used to refrigerate any streams associated with continuous flow separation processes in the IGCC power plant. By further example, the cooled CO2 may replace a refrigeration cycle that circulates a refrigerant (e.g., ammonia or Freon) through a closed loop having a condenser, evaporator, and compressor.

Figure 5:
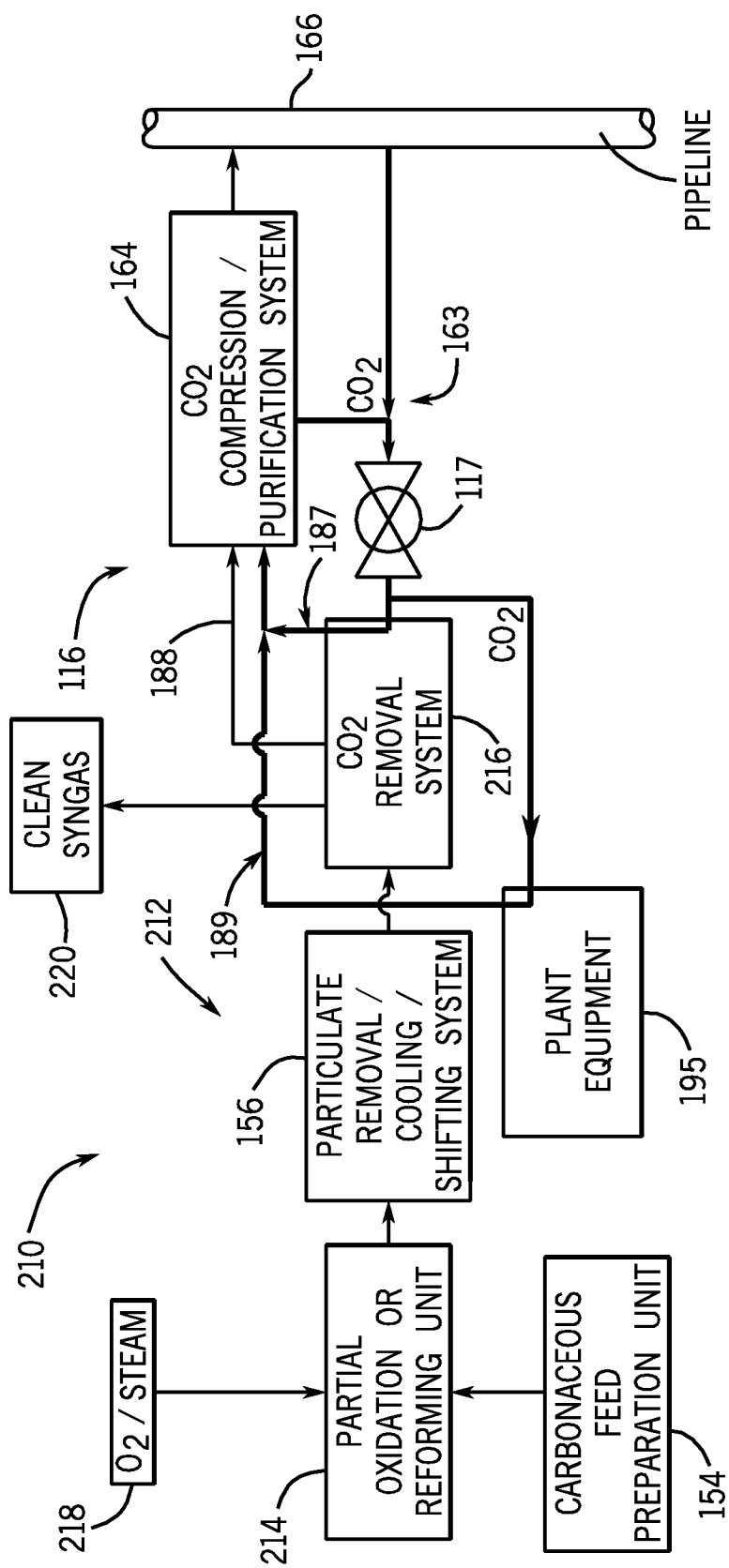
FIG. 5 is a block diagram of an embodiment a carbon capture cooling system including a unique cooling system based on expansion of a captured carbonous gas.

FIG. 5 is a block diagram of an embodiment a carbon capture cooling system 210 including a unique cooling system 163 based on expansion of a captured carbonous gas. In the illustrated embodiment, the system 210 includes a chemical production system 212 and the carbon capture system 116. The chemical production system 212 includes a partial oxidation or reforming unit 214 and the particulate removal, cooling, and shifting system 156. The carbon capture system 116 includes a CO2 removal system 216, as well as the CO2 compression and purification system 164, the pipeline 166, a CO2 storage tank, or another application for the captured CO2. In particular, the carbon capture system 116 provides compressed CO2 to the unique cooling system 163 for expansion of the CO2, thereby cooling the CO2 to act as a coolant for the system 210. The cooled CO2 may be used as a coolant for any component of the system 210, including the partial oxidation or reforming unit 214, the particulate removal, cooling, and shifting system 156, the CO2 removal system 216, plant equipment 195, or any combination thereof.

The partial oxidation or reforming step 214 receives a carbonaceous fuel from the carbonaceous feed preparation unit 154. In certain embodiments, the carbonaceous fuel may include methanol, natural gas, propane, gasoline, autogas, diesel fuel, ethanol, naphtha, or any other carbonaceous material. The partial oxidation or reforming unit 214 also receives a stream of oxygen and/or steam 218. In one embodiment, the partial oxidation or reforming step 214 performs partial oxidation, yielding a syngas mixture including carbon monoxide (CO) and hydrogen (H2) among other gases. For example, the syngas mixture may include CO, H2, CH4, CO2, H2O, H2S, N2, and CO2. In some embodiments, the partial oxidation or reforming unit 214 converts the carbonaceous feed into higher octane products and hydrogen. The system 212 then routes the syngas to the particulate removal, cooling, and shift system 156 for purification as discussed above.

The chemical production system 212 then routes the syngas to the carbon capture system 116. In particular, the particulate removal, cooling, and shift system 156 transfers the syngas to the CO2 removal system 216, which separates the CO2 188 to generate clean syngas 220. For example, the CO2 removal system 216 may be a solvent based system, a membrane-based system, or any other type of system suitable for the removal of CO2. The CO2 removal system 216 transfers the clean syngas 220 to an additional processing unit, a gas turbine, a boiler, or another application. The CO2 removal system 216 transfers the separated CO2 188 to the carbon capture system 116. For example, the CO2 compression and purification system 164 compresses and purifies the CO2, and then routes a first portion to the pipe line 166 and a second portion to the cooling system 163.

In the illustrated embodiment, the cooling system 163 provides a cooled CO2 to the CO2 removal system 216 and the plant equipment 195. For example, the cooling system 163 includes the first coolant loop 187 and the second coolant loop 189. The first coolant loop 187 circulates CO2 through the CO2 removal system 216 and the expander 117, as well as the CO2 compression and purification system 164 and/or the pipeline 166. The second coolant loop 189 circulates CO2 through the plant equipment 195. In the illustrated embodiment, the first coolant loop 187 diverts a portion of the cooled CO2 to the plant equipment 195 before passing through the CO2 removal system 192. However, in other embodiments, the cooled CO2 may be used to cool the CO2 removal system 216 prior to use for cooling the plant equipment 195, depending on the cooling needs. The plant equipment 195 may include a variety of IGCC components, power generation equipment, engines, chemical processing units, heat exchangers, or the like.

Technical effects of the invention may include a carbon capture system 116 in combination with a cooling system 163, wherein a captured carbonous gas (e.g., CO2 of approximately 80-100 percent purity by volume) is used as a coolant in the cooling system 163. The carbon capture system 116 may be a part of any industrial plant, integrated gasification combined cycle (IGCC) power plant, or the like. Likewise, the cooling system 163 may be used to cool a variety of industrial plant equipment, IGCC equipment, or the like. In certain embodiments, a controller or programmed device (e.g., computer system) 222 may include instructions to control the carbon capture system 116 and/or the cooling system 163 to vary the amount of cooling provided by the captured carbonous gas. For example, the controller or programmed device 222 may increase or decrease a rate and/or factor of volumetric expansion of the carbonous gas, thereby increasing or decreasing a temperature change in the carbonous gas. The controller or programmed device 222 may also control a flow rate of the captured carbonous gas (e.g., cooled by volumetric expansion) through one or more cooling circuits (e.g., 163), thereby controlling the amount of cooling provided by the captured carbonous gas. In certain embodiments, the controller or programmed device 222 may control the cooling system 163 to use the captured carbonous gas as a primary source of cooling or a secondary source of cooling. For example, the captured carbonous gas may be used to supplement an existing cooling system (e.g., refrigeration system 180, FIG. 3), which may be downsized considerably due to the incorporation of the carbon capture based cooling system 163.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    a carbon capture system configured to remove a carbonous gas from a syngas to produce a captured carbonous gas, wherein the captured carbonous gas has a purity of at least 80 percent carbon dioxide ($CO_2$) by volume;
    a cooling system comprising a gas expander and a coolant circuit, wherein the gas expander is configured to expand the captured carbonous gas to reduce a temperature of the captured carbonous gas to produce a reduced temperature carbonous gas, and the coolant circuit is configured to utilize the reduced temperature carbonous gas to cool at least one solvent of at least one gas purifier; and
    a controller comprising instructions to control the cooling system to control a temperature associated with cooling the at least one solvent of the at least one gas purifier.

2. The system of claim 1, wherein the purity of the captured carbonous gas is at least 95 percent $CO_2$ by volume.

3. The system of claim 2, wherein the captured carbonous gas is at a pressure of at least approximately 2000 psi.

4. The system of claim 1, wherein the coolant circuit is configured to utilize the reduced temperature carbonous gas to cool the at least one solvent stored in a solvent storage tank for use in the at least one gas purifier.

5. The system of claim 1, comprising the at least one gas purifier configured to clean the syngas upstream from the carbon capture system.

6. The system of claim 5, wherein the at least one gas purifier comprises an acid gas removal (AGR) unit using the at least one solvent, a sulfur removal unit using the at least one solvent, a nitrogen removal unit using the at least one solvent, a water gas shift reactor using the at least one solvent, a carbonous gas removal unit of the carbon capture system using the at least one solvent, or a combination thereof.

7. The system of claim 5, wherein the at least one gas purifier comprises an acid gas removal (AGR) unit and a carbonous gas removal unit, and the coolant circuit is configured to utilize the reduced temperature carbonous gas to cool the at least one solvent of both the AGR unit and the carbonous gas removal unit.

8. The system of claim 1, wherein the coolant circuit is configured to cool a plant equipment separate from the at least one solvent of the at least one gas purifier.

9. The system of claim 8, wherein the plant equipment comprises power generation equipment, an engine, or a combination thereof.

10. The system of claim 1, comprising:
    a gasifier configured to gasify a feedstock to generate the syngas; and
    the at least one gas purifier downstream from the gasifier, wherein the at least one gas purifier has one or more adsorption units to remove hydrogen sulfide ($H_2S$) and carbon dioxide ($CO_2$) from the syngas using the at least one solvent.

11. The system of claim 1, comprising a refrigerant cooling system configured to cool the at least one solvent of the at least one gas purifier, wherein the controller is configured to operate the cooling system as a primary source of cooling the at least one solvent, and the controller is configured to operate the refrigerant cooling system as a secondary source of cooling the at least one solvent.

12. The system of claim 1, comprising the at least one gas purifier, wherein the at least one gas purifier comprises:
    a first absorption unit having a first solvent configured to remove hydrogen sulfide ($H_2S$) from the syngas, wherein the coolant circuit comprises a first coolant loop coupled to the first absorption unit; and
    a second absorption unit having a second solvent configured to remove carbon dioxide ($CO_2$) from the syngas, wherein the coolant circuit comprises a second coolant loop coupled to the second absorption unit.

13. A system, comprising:
    at least one solvent-based gas purifier configured to remove hydrogen sulfide ($H_2S$) and carbon dioxide ($CO_2$) from a gas using at least one solvent;
    a carbon capture system configured to receive the $CO_2$ from the at least one solvent-based gas purifier, wherein the $CO_2$ has a purity of at least 80 percent $CO_2$ by volume; and
    a cooling system comprising a $CO_2$ expander coupled to a cooling circuit, wherein the $CO_2$ expander is configured to expand at least a portion of the $CO_2$ to reduce a temperature of the $CO_2$ to produce a reduced temperature $CO_2$, and the cooling circuit is configured to circulate the reduced temperature $CO_2$ to provide cooling of the at least one solvent.

14. The system of claim 13, wherein the at least one solvent-based gas purifier comprises an acid gas removal (AGR) system using the at least one solvent, and the reduced temperature $CO_2$ is utilized to cool the at least one solvent of the AGR system.

15. The system of claim 13, wherein the at least one solvent-based gas purifier comprises an $H_2S$ absorption unit using the at least one solvent and a $CO_2$ absorption unit using the at least one solvent.

16. The system of claim 13, wherein the carbon capture system comprises a $CO_2$ compressor, a $CO_2$ pipeline, a $CO_2$ storage tank, or a combination thereof.

17. The system of claim 13, wherein the $CO_2$ expander comprises an adiabatic expander.

18. The system of claim 13, comprising plant equipment separate from the at least one solvent-based gas purifier, wherein the plant equipment is configured to be cooled by the reduced temperature $CO_2$.

19. The system of claim 18, wherein the plant equipment comprises power generation equipment, an engine, or a combination thereof.

20. The system of claim 18, wherein the cooling system comprises a cooling circuit coupled to the $CO_2$ expander and the at least one solvent-based gas purifier, wherein the cooling circuit is configured to circulate the reduced temperature $CO_2$ to cool the at least one solvent followed by the plant equipment.

21. A system, comprising:
    at least one solvent-based gas purifier configured to treat a syngas;
    a carbon capture system configured to receive the syngas from the at least one solvent-based gas purifier, wherein the carbon capture system is configured to collect a carbonous gas from the syngas, wherein the carbonous gas has a purity of at least 80 percent carbon dioxide ($CO_2$) by volume; and a coolant system comprising a gas expander coupled to a cooling circuit, wherein the gas expander is configured to expand at least a portion of the carbonous gas to produce a reduced temperature carbonous gas, and the cooling circuit is configured to circulate the reduced temperature carbonous gas to cool at least one solvent of the at least one solvent-based gas purifier.

22. The system of claim 21, wherein the gas expander comprises an adiabatic expander.

23. The system of claim 21, wherein the at least one solvent-based gas purifier comprises an $H_2S$ absorption unit using the at least one solvent and a $CO_2$ absorption unit using the at least one solvent.

* * * * *